July 7, 1970 H. P. ANDERSON ET AL 3,519,757

ELECTRONIC KEY TELEPHONE SYSTEM

Filed Feb. 27, 1968 7 Sheets-Sheet 1

INVENTORS H. P. ANDERSON
M. A. FLAVIN
J. B. GRANDMAISON
G. E. SALTUS
J. L. SIMON

BY [signature]
ATTORNEY

ELECTRONIC KEY TELEPHONE SYSTEM

Filed Feb. 27, 1968 7 Sheets-Sheet 2

July 7, 1970 H. P. ANDERSON ET AL 3,519,757

ELECTRONIC KEY TELEPHONE SYSTEM

Filed Feb. 27, 1968 7 Sheets-Sheet 4

ELECTRONIC KEY TELEPHONE SYSTEM

United States Patent Office 3,519,757

Patented July 7, 1970

3,519,757

ELECTRONIC KEY TELEPHONE SYSTEM

Harold P. Anderson, Lincroft, N.J., Michael A. Flavin, Indianapolis, Ind., and John P. Grandmaison, Matawan, George E. Saltus, Colts Neck, and James L. Simon, Middletown, N.J., assignors to Bell Telephone Laboratories, Incorporated, Murray Hill and Berkeley Heights, N.J., a corporation of New York Filed Feb. 27, 1968, Ser. No. 709,585
Int. Cl. H04q *11/00*
U.S. Cl. 179—18 11 Claims

ABSTRACT OF THE DISCLOSURE

Time division multiplexing techniques and content addressed memory organization are employed in an electronic key telephone system. A content-addressed memory is employed on a scratch pad to maintain the current status of each active line, all other line associated information being stored in a permanent read-only memory used as a station set scanner. Each station set has identity match logic to recognize its identity and perform certain logic during scanning.

BACKGROUND OF THE INVENTION

This invention relates to communications systems and, more particularly, to improvements in intercommunication and key telephone systems. It has for a general object thereof the reduction in cost and simplification of installation, maintenance and rearrangement of such systems.

Key telephone communication systems have evolved to meet the needs of subscribers requiring various special communication features such as access to more than one telephone line, access to intercommunicating lines for originating or answering calls thereon, holding one line while another is seized for use, visual signals, and the like. The provision of these features has in the past necessitated the connection of large numbers of conductors between the individual key telephone station sets and the system common equipment cabinet. Even though it is the usual practice in such systems to multiple as many conductors as possible at various junction points near the station sets, there are still large numbers of connections to be made since each line appearance and feature at each station typically requires individual attention and connection.

In key telephone systems of the type presently available, as many as forty or more individual conductors are necessary to provide a standard 6-button key station set with its full complement of features. A standard 30-button CALL DIRECTOR® station set may require as many as several hundred individual conductors. Not only do such large number of conductors for each station set result in considerable initial connection complexity and cost, they also necessitate considerable time and cost for subsequent changes and rearrangement and for maintenance. The economic burden imposed is significant and, moreover, the necessity for providing for such large numbers of conductors often presents structural difficulties in the placement or concealment of the conductors.

Additionally, it is becoming increasingly apparent that the requirements of many subscribers include service features which have not been provided heretofore. From an economic standpoint, and from a convenience standpoint, it is desirable to provide such new service features in key telephone systems without any increase in the number of conductors associated with the individual station sets.

SUMMARY OF THE INVENTION

It is therefore an object of this invention to provide a key telephone system in which the number of conductors extended to each station set is substantially reduced from that presently required, thereby reducing the cost of installation and rearrangement.

It is a further object of this invention to provide a key telephone system in which the number of conductors extended to an individual station set and the connection of the conductors to the set are independent of the number of buttons or features provided, thereby permitting direct interchangeability between different station sets such as 6-button sets and 30-button CALL DIRECTOR® sets.

Another object of this invention is to provide a key telephone system in which the number of conductors extended between the individual station sets and the system common equipment is substantially reduced without affecting or reducing the service features provided, and in which new service features can be provided without any increase in the number of conductors extended to the individual station sets.

These and other objects of the present invention are attained in an illustrative embodiment of a key telephone system utilizing time division multiplexing techniques and distributed logic, content-addressed memory organization to reduce the number of conductors required to connect the individual station sets to the system common equipment. In particular, each station set in the illustrative embodiment herein requires only seventeen conductors extended thereto, by way of example, regardless of the number of key pushbuttons or features provided at the set. Moreover, except for the voice communication channel in the specific illustrative embodiment, all of the station sets are connected identically and in parallel to a common data bus running to the system equipment, thereby further reducing the cost and complexity of installation and rearrangement. As will be apparent from the description hereinbelow, a common voice communication channel, utilizing time division multiplexing technques, for example, can be employed also if desired instead of individual voice communication channels to provide completely parallel system organization.

In accordance with one aspect of the illustrative embodiment of the invention, a permanent memory is employed to store a word associated with each line appearance in the key telephone system, each line appearance word containing the corresponding switching network terminal number and other associated information, such as station set and key identification. A temporary store, a content-addressed memory according to another aspect of the invention, is employed to maintain the current status of each active line in the system. Using the permanent memory as a line appearance code generator, the various station sets in the system are scanned over the data bus at a predetermined line appearance scan rate. During each scan the up-to-date status of each off-hook station set is registered in the content-addressed memory. Responsive to an incoming call the called line number is registered in the temporary, content-addressed memory and the appropriate station sets are signaled during the next scan cycle.

Once a station set is connected initially, no further wiring changes need be made. Relocation and rearrangement changes are made quite simple by writing new line appearance words in the permanent memory at the central location. Moreover, since all station sets are connected to the common data bus in an identical manner, a station set can be moved physically from one office to another by merely unplugging the set and plugging it in at the new location.

According to a further aspect of the invention, deriving from the content-addressed memory organization in which the system logic is to some extent distributed among the various station sets, each station set is provided with sufficient logic to recognize its identity during a scan cycle and to perform certain functions upon such recognition. Thus, with parallel data and voice communication system organization this station identity logic can be placed on a removable card or circuit which is plugged into the station set, thereby providing the subscriber with a "portable extension" service feature. The subscriber can remove the card or circuit from his original set and take it with him to plug into a distant set, all calls destined for his original set being then received at the distant set. Thus, calls can be diverted temporarily from one station set to another such as from an office location to a laboratory location, without any additional circuitry or apparatus being required and without any changes at the system common equipment.

BRIEF DESCRIPTION OF THE DRAWING

The above and other objects and features of the invention may be more readily apprehended from the following detailed description, taken in conjunction with the accompanying drawing, in which.

GENERAL DESCRIPTION OF THE INVENTION

Figures 1, 6:
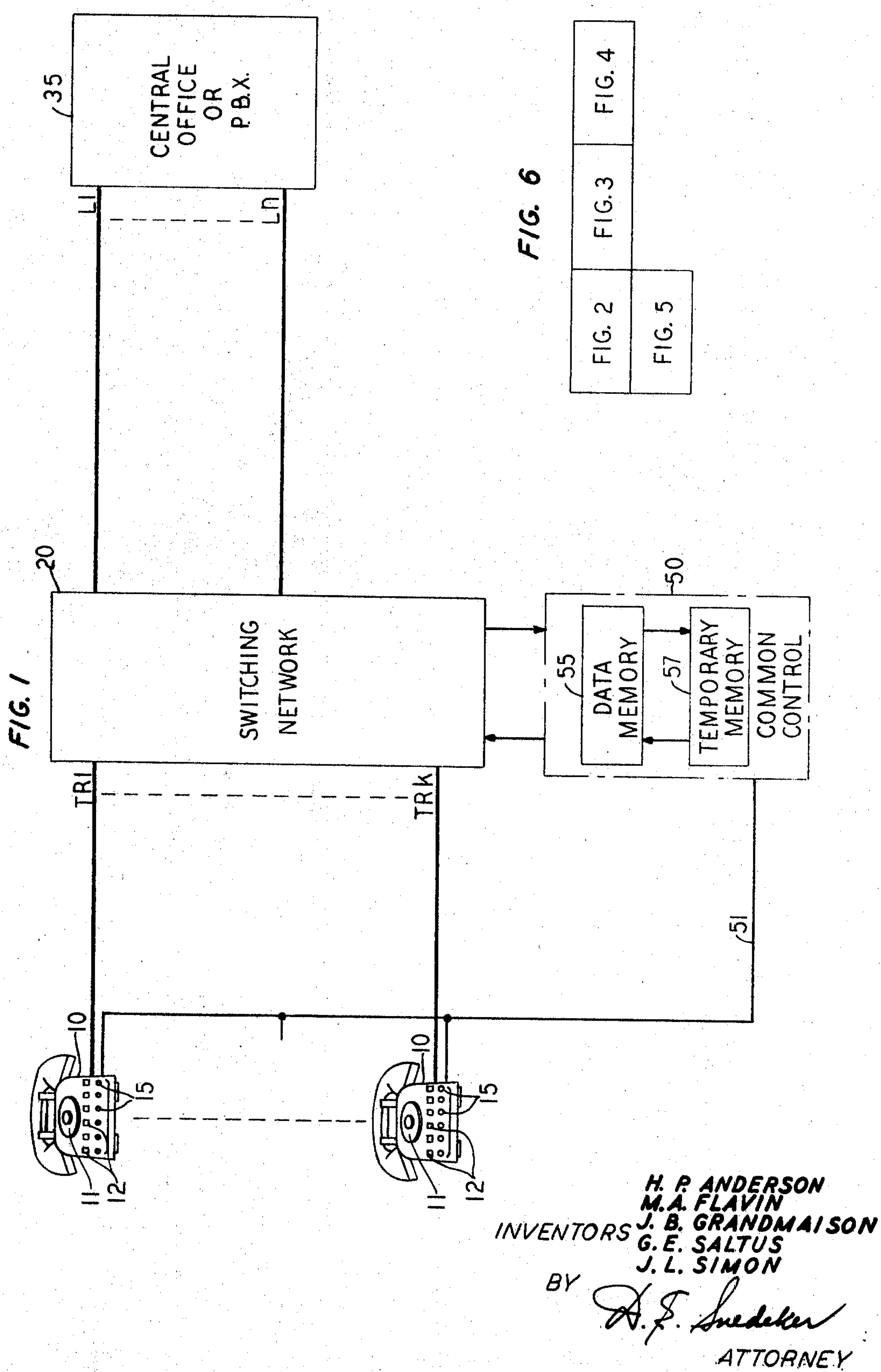
FIG. 1 is a block diagram showing the major functional component included in an illustrative key telephone system embodying the principles of the present invention.

The functional block diagram representation in FIG. 1 of an illustrative key telephone system in accordance with the principles of our invention comprises a plurality of multi-key subscriber station sets 10 which are selectively connectable through a switching network 20 and a plurality of lines L1 through L*n* to a telephone terminal 35, such as a distant central office or a PBX. In accordance with the principles of our invention, station sets 10 may be connected to switching network 20 over a common voice communication channel to which the several station sets are multiplexed, in a manner known in the art, or individual voice communication channels may be provided for each station set. For the purposes of describing the invention, it will be assumed herein that each station set 10 is individually connected to switching network 20 via a respective talking path or voice communication channel TR1 through TR*k*. It will be noted that the voice channels in FIG. 1, as well as in the remainder of the drawing, are indicated by relatively heavy solid lines to clearly delineate them from the channels or paths provided for supervisory and control signals.

Each station set 10 includes a dialing mechanism, such as rotary dial 11, a set of signaling lamps 15, and a plurality of keys or pushbuttons 12 which are respecticely associated with the different service features available at that station set. These features may include, for example, multiple line selection, line hold, line exclusion, or intercom. The signaling lamps 15 may be respectively associated with the individual keys 12, as is well known in the key telephone art, to provide, for example, a flashing signal when an associated line is ringing, a winking signal when the line is on HOLD, and a steady signal when the line is busy. As will be apparent from the description herein, keys 12 will be either locking or nonlocking in accordance with our invention.

The illustrative key telephone system of FIG. 1 also includes common control 50 to which each station set 10 is connected via common data bus 51. Common control 50 comprises a permanent direct-addressed data memory 55 and a temporary memory 57, which may be advantageously content-addressed. Data memory 55 contains a stored word associated with each line appearance or key at each station set in the key telephone system, referred to herein as a line appearance word. The individual line appearance words contain, for example, a corresponding terminal number in switching network 20 and other associated information such as station set and key identification. In operation the various station sets 10 in the key telephone system are scanned continuously on a time division basis over data bus 51 using data memory 55 as a line appearance code generator.

Memory 57 is employed as a temporary memory, or "scratch pad," to maintain the current status of each active line in the system. Content-addressed organization of memory 57 allows simultaneous search of the entire memory on the basis of content rather than location, location of a word in memory 57 requiring only a nondestructive comparison of search criteria with the stored words. During each scan of station sets 10 by data memory 55 the up-to-date status of each off-hook set is registered in temporary memory 57. When an incoming call to the system is received on one of lines L1 through L*n*, the number of the called line is coded by common control 50 and placed in memory 57. The appropriate ringing and lamp signals are transmitted during the next scan by common control 50 over data bus 51 to each of station sets 10 having the called line appearing thereat. When one of these stations goes off-hook to answer the incoming call and presses the corresponding key 12 to select the called line, common control 50 is responsive thereto during the next scan over data bus 51 to update memory 57 and, via data memory 55, to cause switching network 20 to connect the answering station set to the called line.

The initiation of a call at one of station sets 10 by going off-hook and pressing one of keys 12 effects transmission of information over data bus 51 during the next scan cycle identifying the state of the particular station set and key. The change in state from on-hook to off-hook is detected by memory 57, resulting in transmission to that station set during the succeeding scan cycle of a steady lamp signal, causing the lamp 15 associated with the selected station set key to be lit. A steady lamp signal is also transmitted to lamps at other ones of station sets 10 which lamps correspond to the line appearance selected at the station set initiating the call. At the same time common control 50 directs switching network 20 to connect the station set initiating the call to the selected one of lines L1 through L*n* to switching terminal 35 in the manner discussed above for an incoming call.

A number of advantages arise from a key telephone system such as shown in FIG. 1. All control and supervisory signals between the individual station sets and the system common equipment are time division multiplexed over common data bus 51. This substantially reduces the number of conductors which must be extended to each station set and further permits identical connection of all station sets to the data bus, regardless of the different features and regardless of the number of keys provided at the individual sets. Service feature and rearrangement changes are made by writing new line appearance words in data memory 55, no wiring changes being necessary therefor. New features can be added without extending additional conductors to the station sets. Moreover, station sets can be moved from one location to another by simply unplugging the set and plugging it in at the new location. No change in data memory 55 is required if a common voice communication channel is employed in the system; if individual voice communication channels are employed for each station set, as shown illustratively in the drawing, the only change required in memory 55 is to change the switching network terminal number in the line appearance words for the station set. A more complete and comprehensive description of a specific illustrative embodiment in accordance with the principles of the present invention will be found hereinbelow in the detailed description of the block diagram shown in FIGS. 2 through 5, arranged as indicated in FIG. 6.

DETAILED DESCRIPTION OF THE INVENTION

In FIGS. 2 through 5, portions of an illustrative embodiment of a key telephone system according to our invention are shown in greater detail. Specifically, a multiple key station set 101 is shown in detail in FIG. 2 and the system common control is shown in detail in FIGS. 3 and 4. The other station sets in the system, such as station sets 102 and 10*k*, are assumed to be substantially similar to station set 101, except that the number of keys or features provided may vary from set to set. For example, a typical 30-button CALL DIRECTOR® station set is depicted illustratively as station set 102 in FIG. 5.

Figure 2:
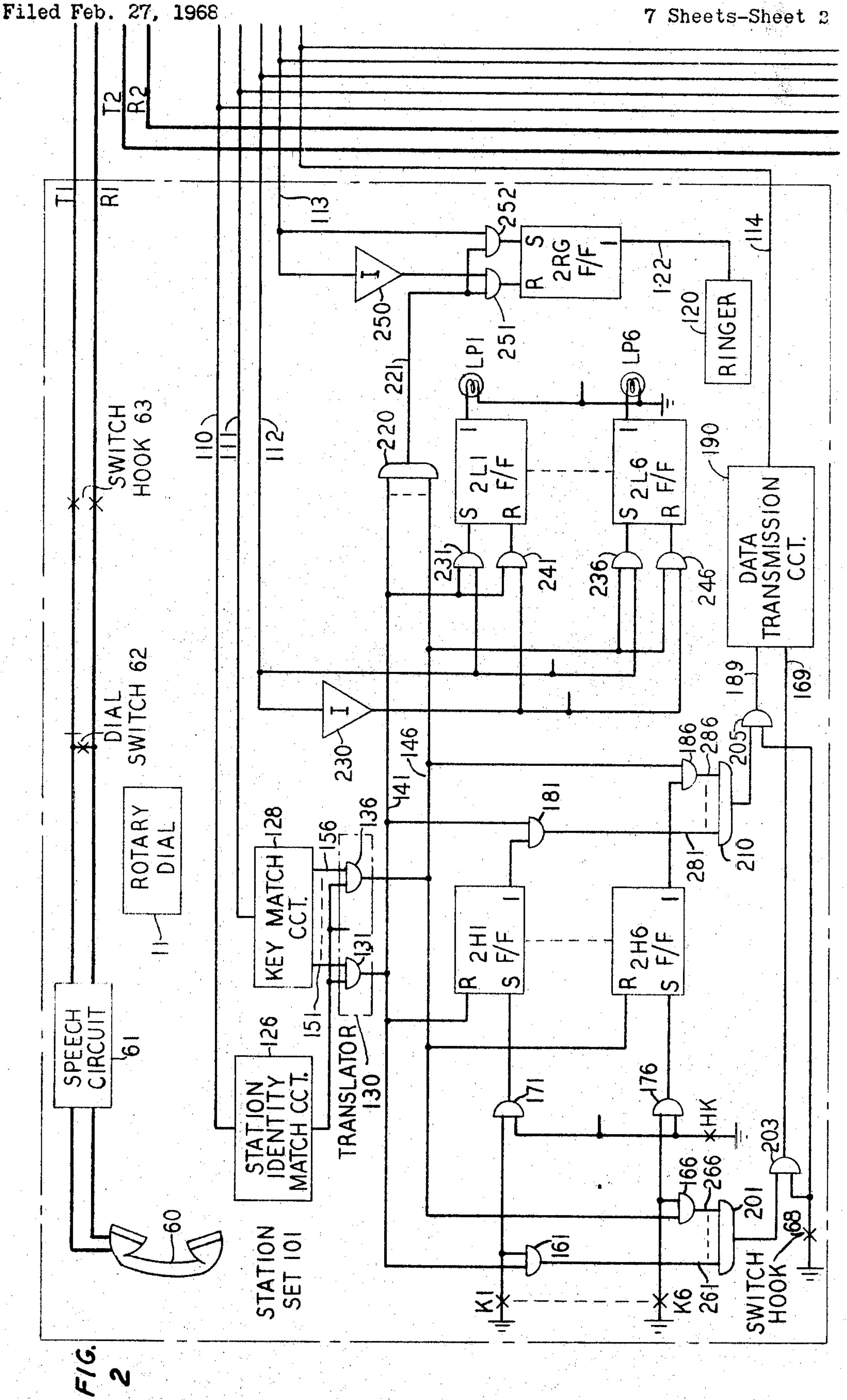
FIGS. 2 through 5, when arranged as indicated in FIG. 6, comprise an additional block diagram of a specific illustrative embodiment of a key telephone system according to our invention showing portions thereof in greater detail.
Figure 3:
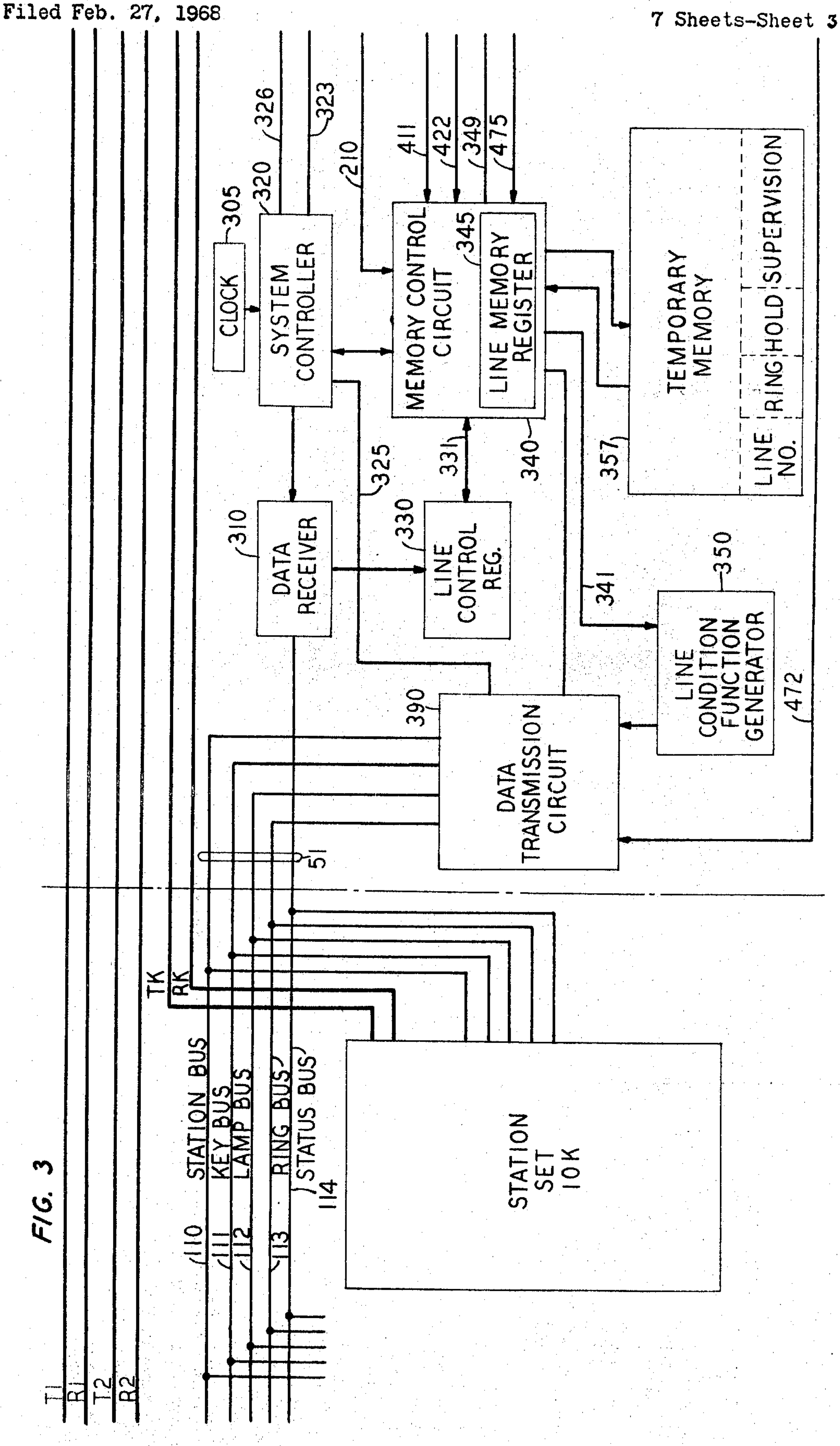
Figure 4:
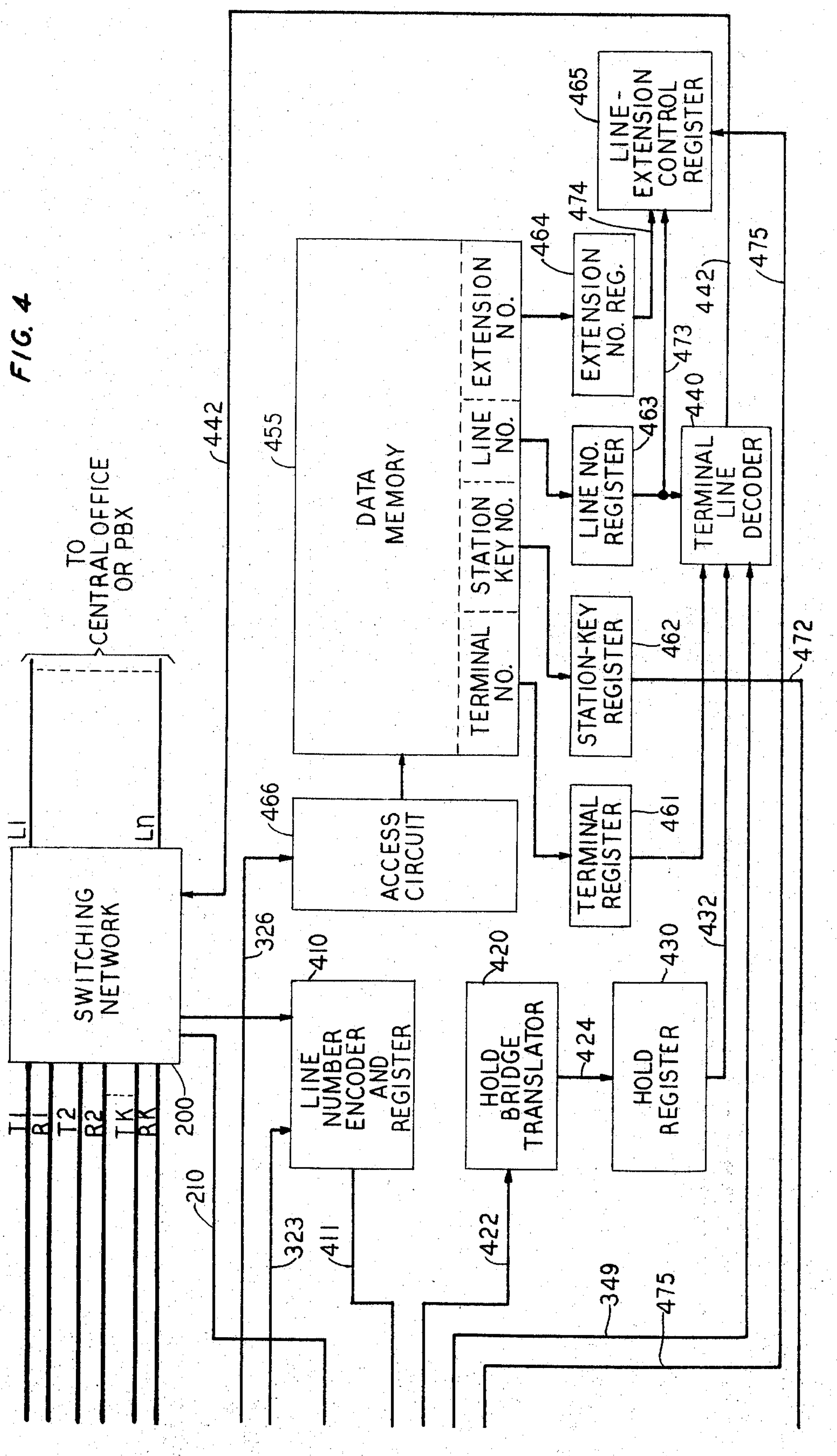

Each station set in the key telephone system, it will be recalled, is connected over a respective talking path to a switching network, such as switching network 200 in FIG. 4. The individual talking path for each station set in FIGS. 2 through 5 illustratively includes a single set of tip and ring conductors, such as conductors T1 and R1 for set 101, regardless of the number of line appearances at the station set. The tip and ring conductors T1 and R1 terminate at station set 101 in a conventional speech circuit 61 and handset 60. As shown in FIG. 2, tip and ring conductors T1 and R1 also include dial switch 62 and a pair of switchhook contacts 63. Switchhook contacts 63 are normally open, indicative of an on-hook condition, and contacts 63 close in conventional fashion when handset 60 is lifted from its cradle to go off-hook. Dial switch 62 is a transfer contact pair which operate repetitively in a conventional fashion during dialing operation by rotary dial 11.

Station set 101 further comprises a plurality of keys K1 through K6 depicted as individual make contacts in FIG. 2 and assumed herein to be of the locking type for the purposes of description. Each key K1 through K6 represents a separate subscriber service feature available at station set 101 such as multiple line selection. For example, it will be assumed herein for the purposes of description that keys K1 through K6 individually provide for the selection of predetermined ones of lines L1 through L*n* on which calls can be initiated or received at station set 101. Hold key HK provides for the usual service feature of holding one line while another line is seized for use. Hold flip-flops 2H1 through 2H6 are associated with respective ones of line selection keys K1 through K6 to form a line hold memory.

In the audio and visual signaling portion of station set 101 an audible tone ringer 120 and associated ring flip-flop 2RG are provided along with lamps LP1 through LP6 and associated lamp flip-flops 2L1 through 2L6. Lamps LP1 through LP6 are respectively associated with line selection keys K1 through K6 and thus individually correspond to the predetermined ones of lines L1 through L*n* appearing at, and accessible to, station set 101. Control of lamps LP1 through LP6 and ringer 120 is effected via key match gates 131 through 136 of translator 130 and key control leads 141 through 146 in the manner described in detail below.

Station sets 101 through 10*k* are each connected in common over data bus 51 to common control shown in FIGS. 3 and 4 for the transmission of supervisory and control information between the individual station sets and common control on a time division basis. In particular, data bus 51 includes station bus 110, key bus 111, lamp bus 112 and ring bus 113 for transmission of information from common control to the individual station sets and data bus 51 further includes status bus 114 for transmission of station set status information from the station sets to common control. Buses 110 through 114 may respectively comprise, for example, eight, three, one, one and two conductors for a total of only fifteen conductors included in data bus 51.

A key telephone system can be organized on a station basis or on a line basis. Although either system organization can be employed in accordance with our invention, station organization will generally be preferable since it yields simpler station set circuitry. Accordingly, the illustrative embodiment in FIGS. 2 through 5 is depicted as a station organized key telephone system, each of station sets 101 through 10*k* being assigned a unique multibit station identity code, illustratively compromising eight bits. A station identity match circuit is provided at each station set, such as match circuit 126 at station set 101, for recognizing the appearance of that station set's unique station identity code on station bus 110.

It will be appreciated, moreover, that the number of line appearances at an individual station set can vary from one line appearance up to perhaps the number of total lines L1 through L*n* available. To obviate the necessity for providing different circuit realizations for different sized stations in a station organized system, each station identity code is defined advantageously herein as a fixed group of line appearances or keys, such as the six keys K1 through K6 at station set 101. If a station set in the system has more than six line appearances associated therewith, additional station identity codes are assigned to the station set for each additional group of six line appearance keys. Thus, by way of example, station set 102 in FIG. 5 having thirty line appearance keys KK1 through KK30 is assigned a total of five different station identity codes, one for each group of six Reys. Station identity match circuit 526 at station set 102 accordingly recognizes each of the five station identity codes assigned to the set. Responsive thereto, match circuit 526 provides an output on a respective one of station identity leads 591 through 595 corresponding to the particular code and thus to the group of six keys to which the code is assigned.

In addition to the station identity match circuits, a substantially identical key match circuit is provided at each station set and is connected in common to key bus 111, such as key match circuits 128 and 528 in station sets 101 and 102. The key match circuit at each station set is responsive to key identity information transmitted by common control on key bus 111, illustratively comprising three bits, to provide a corresponding key identifying output signal at the set. Since groupings of six keys have been assumed in the illustrative embodiment each key match circuit has six output leads. Thus, key match circuit 128 in station set 101 has six output leads 151 through 156 individually connected to respective key match gates 131 through 136 in translator 130. Station identity match circuit 126 is connected in common to each of gates 131 through 136, the output of circuit 126 enabling gates 131 through 136 to direct the key identifying signals therethrough from circuit 128 to respective key control leads 141 through 146.

Figure 5:
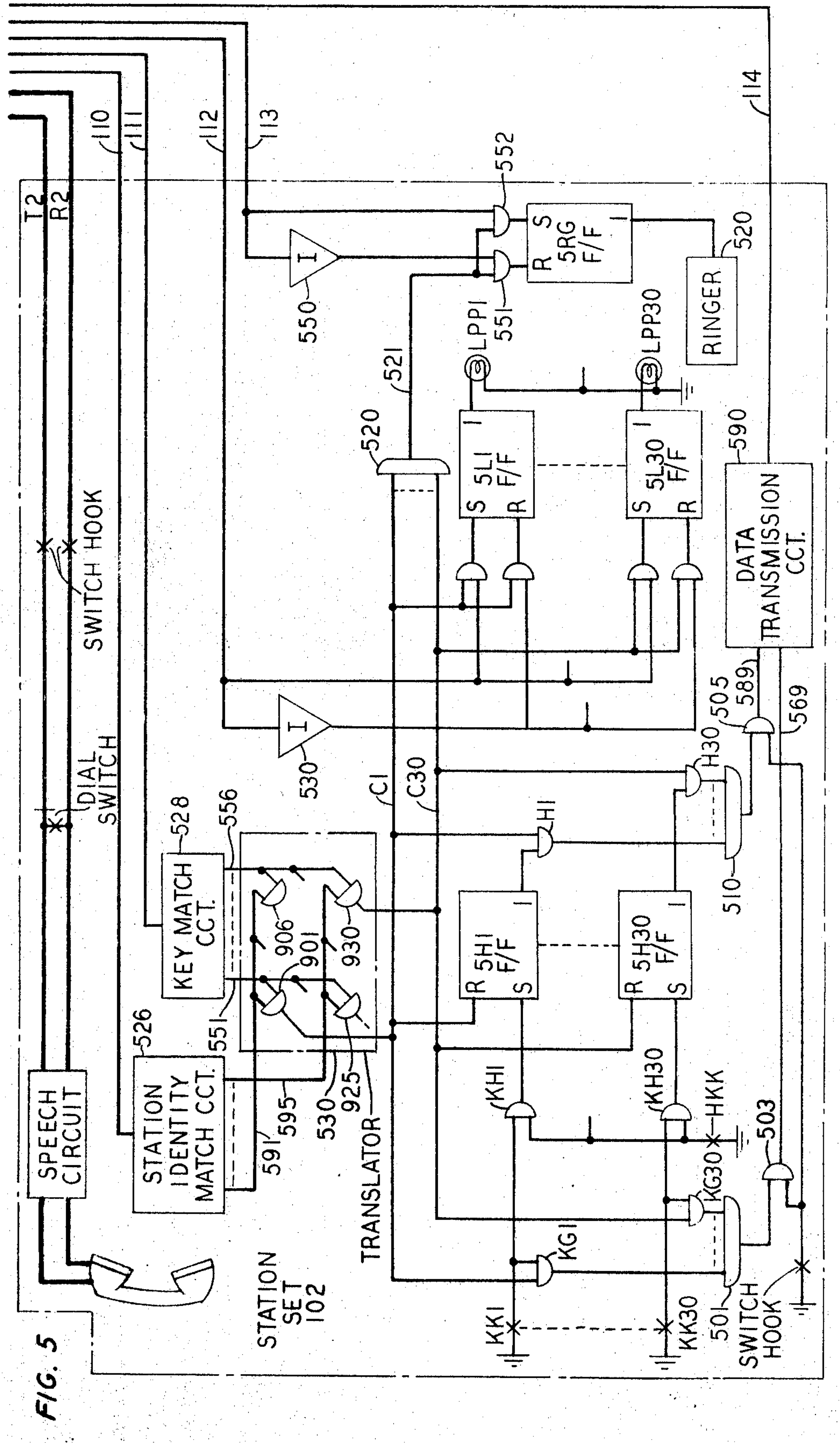

Similarly, translator 530 in station set 102 comprises a plurality of key match gates 901 through 930 for directing key identifying output signals from key match circuit 528 to appropriate ones of key control leads C1 through C30. The key match gates of translator 530 may be arranged for this purpose, as shown in FIG. 5, in a five-by-six coordinate array with the six vertical inputs connected to the respective output leads 551 through 556 of key match circuit 528, and the five horizontal inputs connected to the respective output leads 591 through 595 of station identity match circuit 526. Coincidence of a station identity signal on one of leads 591 through 596 and a key identifying signal on one of leads 551 through 556 provides a signal through the appropriate one of the gates in translator 530 to the Rey control C1 through C30 corresponding to the particular station and key identity codes.

Turning now to the common control shown in FIGS. 3 and 4, data memory 455 thereof is a permanent, direct-addressed memory employed to store a word associated with each line appearance or key feature at each station set in the system. Each line appearance word in memory 455 is a multibit word containing the corresponding line terminal number in switching network 200, the station and key identity, the line number (L1 through L*n*), and the extension number. The extension number is a distinct code assigned to each appearance of a particular line in the system. In operation, data memory 455 functions as a line appearance code generator for continuously scanning station sets 101 through **10*k* over data bus 51 on a time division basis. Access circuit 466 is provided for accessing the various line appearance word locations in data memory 455. Memory 455** can be a read-only memory, such as a permanent magnet twistor memory, with a very limited word alteration capability, since the words therein will be altered relatively infrequently and such alteration can be accomplished at low speed.

Temporary memory 357 is employed as a "scratch pad" to maintain the control and supervisory information pertaining to each active line in the system. Each line control word in temporary memory 357 contains the line number, a ring bit, a hold bit, and supervision bits numbering one for each extension of the particular line. In accordance with one aspect of the invention, memory 357 is advantageously content-addressable by memory control circuit 340 to permit simultaneous search of all of the words in the memory on the basis of content rather than address location. Memory 357 is thus addressed by the line number for retrieval or updating of the line control information without a search routine. During each scan of station sets 101 through **10*k*, as will be described in detail below, the up-to-date status of each off-hook station set is registered in temporary memory 357 under the control of memory control circuit 340. Since only information pertaining to lines actively in use is stored in memory 357**, it requires a relatively small word storage capability.

Line condition function generator 350 is provided in common control for generating suitable ringing and visual signals at the proper rates for transmission over ring bus 112 and lamp bus 113 to the station sets. The ringing and visual signals comprise a lamp bit and a ring bit, the lamp bit occurring at a rate in accordance with the type of visual signal to be provided at the particular station set, that is, whether steady, flashing, or winking, for example. When a "1" lamp bit is transmitted over lamp bus 112 the appropriate lamp flip-flop at the particular station set is set to light the corresponding lamp. Transmission of a "0" lamp bit resets the lamp flip-flop to extinguish the lamp. The ring flip-flop and the ringer at the station set similarly respond to the binary character of the ring bit on ring bus 113.

Figure 7:
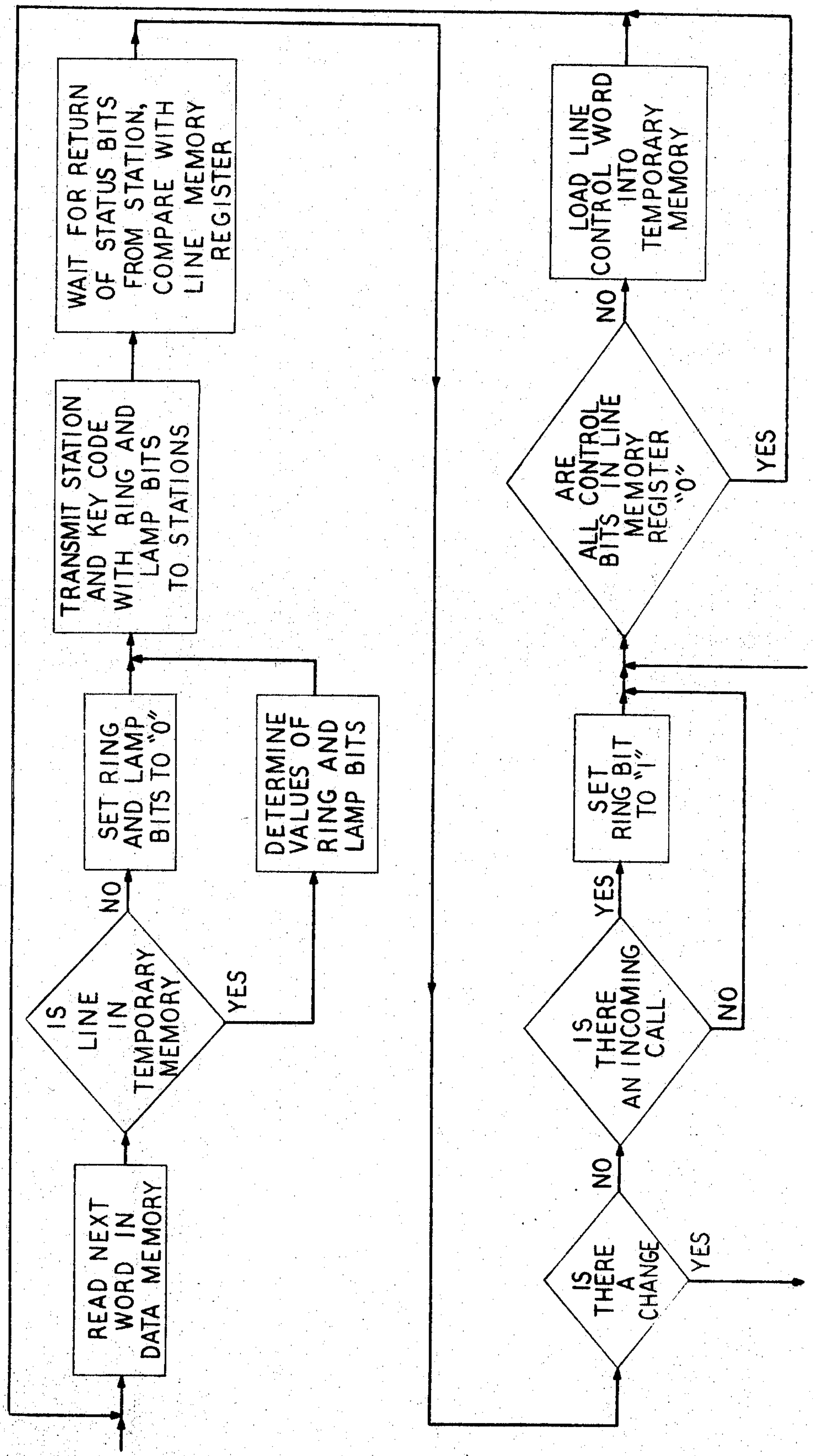
FIGS. 7 and 8, when arranged as indicated in FIG. 9, show a sequence chart useful in describing the operation of the invention.
Figure 9:
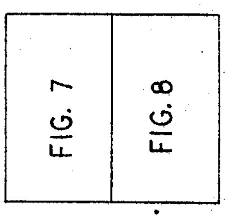
Figure 8:
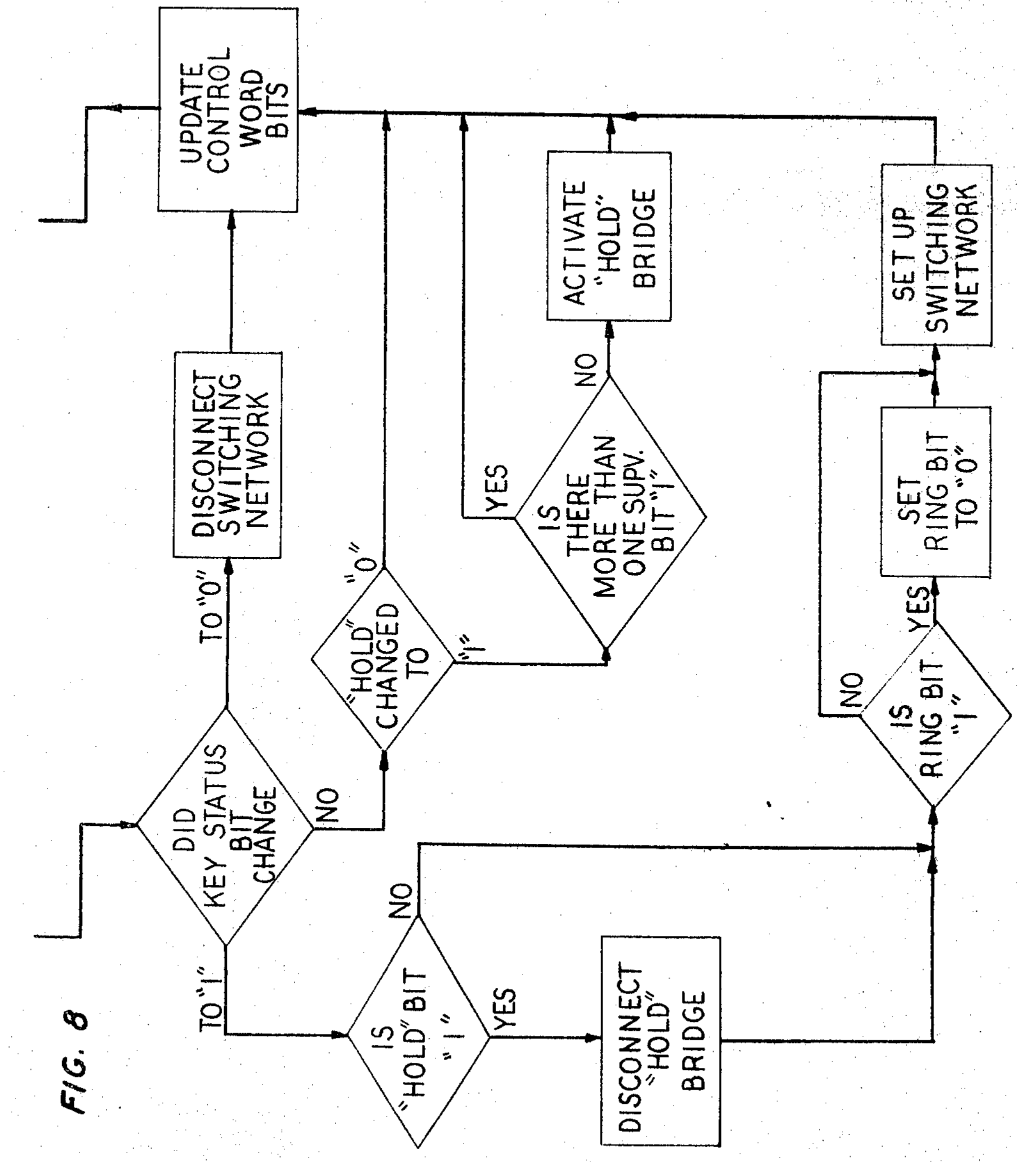

With the above description in mind, and with reference to the sequence chart shown in FIGS. 7 and 8, arranged as indicated in FIG. 9, consider now the operation of the key telephone system shown in FIGS. 2 through 5. Assume that the system is operating and that initially there are no calls in progress, no calls being initiated, and no calls being received. Therefore, there are no lines which require control information and thus there are no line control words stored in temporary memory 357. Data memory 455 is functioning as a line appearance code generator, continuously cycling under the control of system controller 320 via access circuit 466 at a line appearance scan rate provided by clock 305. The scan rate is determined principally by the number of station line appearances in the system since any change in state pertaining to each line appearance at each station must be detected. Assuming a key telephone system of two hundred fifty-five stations of six line appearances each, for example, a line scan rate on the order of 100 milliseconds would be suitable.

During scanning operation with data memory 455 functioning as a line appearance code generator, each word in data memory 455 is read out in sequence and the respective portions thereof are registered in registers 461 through 464. The line number and the extension number are extended by registers 463 and 464 over paths 473 and 474, respectively, to line-extension control register 465, which is connected over path 475 to memory control circuit 340. Each time a new line number and extension number is registered in register 465, memory control circuit 340 registers the line number in line memory register 345 and searches the contents of temporary memory 357 to determine if a control word pertaining to that line number is stored therein. If the line number is present in memory 357 the associated ring, hold and supervision bits are read out by memory control circuit 340 and registered in line memory register 345. The ring, hold and supervision bits are extended over path 341 to line condition function generator 350. Generator 350 is responsive thereto for generating the appropriate lamp and ringing signals for transmission to the station sets by data transmission circuit 390. Initially, however, it is assumed that no lines in the system are active and thus that no line control words are present in temporary memory 357. A search of memory 357 yielding no pertinent line control word causes all binary "0's" to be registered in line memory register 345.

At the same time, the station and key identity codes for the line, registered in station-key register 462, are extended over path 472 to data transmission circuit 390. Under the control of system controller 320 via path 325 data transmission circuit 390 transmits the station and key identity codes, and the lamp and ring signals, if any, provided by generator 350, over data bus 51 to each of station sets 101 through **10*k*. As mentioned above, the station identity code is transmitted over station bus 110, the key identity code is transmitted over key bus 111, and the lamp and ring signals over lamp bus 112 and ring bus 113**, respectively.

Assume, for example, that the station identity code transmitted over station bus 110 is the code assigned to station set 101 and that the key identity code on bus 111 corresponds to key K1 thereat. A binary "0" appears on lamp bus 112 and also on ring bus 113 indicating that no control information appears in memory 357 pertaining to this line appearance at station set 101. Station identity match circuit 126 recognizes the station identity code on bus 110 and enables each of key match gates 131 through 136 in translator 130. Key match circuit 128 is responsive to the key identity code on bus 111 to provide a key identifying signal on output lead 151, which is extended through enabled gate 131 to key control lead 141.

The key identifying signal on control lead 141 is directed to key gate 161, to hold gate 181, through OR gate 220 over lead 221 to ring gates 251 and 252, to lamp gates 231 and 241, and to the reset terminal of hold flip-flop 2H1. Since it is assumed that station set 101 is on-hook and that no lines thereat are active, hold flip-flop 2H1 is reset and hold gate 181 is disabled, thereby blocking the passage of the key signal on lead 141 therethrough. If it is assumed that key K1 is not depressed, key gate 161 is disabled and blocks the passage of the key signal on lead 141 therethrough. If key K1 is assumed to be depressed, key gate 161 will be enabled thereby to extend the key signal on lead 141 over lead 261 and through OR gate 201 to gate 203. Gate 203, however, is disabled by switch hook contact 68 due to the on-hook condition of station set 101. Accordingly, no signals appear on either of leads 169 and 189 to data transmission circuit 190.

The "0" bit on lamp bus 112 through inverter 230 enables lamp gate 241 extending the key signal on lead 141 therethrough to the reset terminal of lamp flip-flop 2L1. Similarly, the "0" bit on ring bus 113 through inverter 250 enables ring gate 251 extending the key signal on lead 221 therethrough to the reset terminal of ring flip-flop 2RG. Thus, flip-flops 2H1, 2L1 and 2RG remain in their reset states, lamp LP1 remains extinguished and ringer 120 remains de-energized.

Data transmission circuit 190 transmits status information over bus 114 to data receiver 310 at common control when station set 101 is scanned. This status information comprises a key status bit and a line hold status bit pertaining to the particular line appearance being scanned at station set 101. In the absence of signals on leads 169 and 189, as in the present instance when the scanned line is idle, data transmission circuit 190 transmits a key status "0" bit and a line hold "0" bit over bus 114 to data receiver 310. Under control of system controller 320, the received line status bits are registered in line control register 330 and are compared, via memory control circuit 340 over path 331, with the corresponding bits of the line control word in line memory register 345. If they differ, temporary memory 357 is accessed by memory control circuit 340 and updated to incorporate the change. If there is no difference between the line control word read from memory and appearing in register 345 and the line status information appearing in line control register 330, as in the present instance where both registers contain all binary zeros, no change is indicated and no entry or change is made in memory 357. The next line appearance word is then read from data memory 455 and the above sequence is repeated.

Assume now that there is an incoming call on one of lines L1 through L*n*, such as line L1, and that the called line appears at station sets 101 and 102 and is selected by key K6 at station set 101 and by key KK1 at station set 102. The incoming call on line L1 appears to the system as a network terminal number in switching network 200. The corresponding line number for line L1 is encoded therefrom and registered in line number encoder and register 410. The called line number registered in encoder and register 410 is extended to memory control circuit 340 over path 411 under the control of system controller 320 via path 323. Data memory 455 continues to cycle in the manner described above until a line appearance word is read out and registered in line-extension control register 465 having the same line number as that registered in encoder and register 410. For example, this might be the line appearance word in memory 455 corresponding to key KK1 at station set 102.

Memory control circuit 340 addresses temporary memory 357 as usual and finds no control word therein for line L1 since the system was idle prior to the present incoming call. Binary zeros are thus registered in the ring, hold, and supervision positions in line memory register 345 and are directed over path 341 to line condition function generator 350, which is responsive thereto to provide lamp and ring "0" bits to data transmission circuit 390. The lamp and ring "0" bits are transmitted over data bus 51, along with the station identity code for the key group including key KK1 at station 102 and the key identity code for key KK1. Station identity match circuit 526 at station 102 recognizes the station identity code on bus 51 and energizes lead 591 to enable the corresponding group of six key match gates 901 through 906 in translator 530. Key match circuit 528, responsive to the key identity code for key KK1, provides a key signal on lead 551 which is extended through enabled gate 901 to key control lead C1. Since station set 102 is assumed to be on-hook, no signals appear on leads 569 and 589, and thus data transmission circuit 590 returns "0" key and hold status bits over bus 114 to data receiver 310. The status bits from station set 102 are registered in line control register 330 and compared with the corresponding bits registered in line memory register 345. Both registers contain all binary zeros in these bit positions at this point, and thus no change is indicated.

Memory control circuit 340 then compares the line number in register 465 with the line number of the incoming call registered in encoder and register 410. A match is obtained indicative of an incoming call on line L1, which appears at key KK1 of station set 102. Responsive thereto, the incoming call is cleared from encoder and register 410 and memory control circuit 340 sets the ring bit in line memory register 345 to "1" and writes the line number for line L1 and the contents of register 345 into memory 357. Memory 357 at this point, then, contains a single line control word comprising the line number of line L1 along with a "1" ring bit and zeros in all other bit positions. The next line appearance word is then read from data memory 455 under control of system controller 320 and the scan cycle continues.

Data memory 455 continues to cycle in the manner described above until a line appearance word is read out and registered in line-extension control register 465 having the line number for line L1. For example, this might be the line appearance word in memory 455 corresponding to key K6 at station set 101 in the illustrative example. The line control word for line L1 in memory 357 is destructively read out by memory control circuit 340 and registered in line memory register 345. Line condition function generator 350 is responsive to the binary "1" ring bit over path 341 to provide appropriate ring and lamp signals to data transmission circuit 390 for transmission over data bus 51 along with the identity codes for key K6 at station 101.

Responsive to the station and key identity codes on bus 51, a key identifying signal is provided in the manner described above on key control lead 146. Since station set 101 is on-hook, "0" status bits are returned over status bus 114 by data transmission circuit 190. The ring signal on bus 113, however, is directed to the set terminal of ring flip-flop 2RG through ring gate 252, enabled by the key signal on lead 146, through OR gate 220 over lead 221. Ring flip-flop 2RG is set thereby, providing a signal on lead 122 to energize ringer 120. Similarly, the lamp signal on bus 112 sets lamp flip flop 2L6, via enabled lamp gate 236, to light lamp LP6.

Memory control circuit 340 compares the returned status bits from station set 101 with the line control word in register 345 as above. Since no change in the status of set 101 is indicated, the line control word for line L1, inclusive of the "1" ring bit, is written back into memory 357. The scan cycle continues and the above sequence is repeated each time the line number for line L1 appears in register 465. This will occur once during each scan cycle for each appearance of line L1 at station sets 101 through 10k until the call is abandoned or until it is answered by one of the station sets.

If the incoming call on line L1 is abandoned by the calling party before it is answered, the ring and lamp signals to the station sets must be discontinued. This is accomplished quite simply in the following manner. Whenever memory control circuit 340 detects a "1" ring bit in a line control word registered in line memory register 345, control circuit 340 automatically initiates a busy test of the corresponding line via terminal-line encoder 440. Responsive to a busy test signal on path 349 from control circuit 340, encoder 440 is enabled to direct the terminal number for the line from register 461 over path 442 to switching network 200. The terminal number registered in register 461, of course, is provided by the line appearance word read out of data memory 455.

Upon receipt of a terminal number over path 442, switching network 200 performs a busy test in conventional manner. If the call has not been abandoned the terminal number corresponding to the line on which the incoming call appears will test busy. When the terminal tests busy, memory control circuit 340 writes the contents of register 345, including the "1" ring bit, back into memory 357 as described above. If, on the other hand, the terminal is idle, indicating that the call has been abandoned, an idle signal is provided by switching network 200 over path 210 to control circuit 340. Control circuit 340 then sets the contents of line memory register 345 to zero, and no control word for that line is returned to memory 357.

Assume, however, that the call on line L1 is not abandoned and that it is answered by station set 101 going off-hook and key K6 being depressed. During the next scan of that line appearance at set 101, the key signal on lead 146 is extended through gate 166 (enabled by depressed key K6), through OR gate 201, through gate 203 (enabled by switch hook contact 68 when set 101 goes off-hook), and over lead 169 to data transmission circuit 190. Responsive to the presence of a signal on lead 169 and no signal on lead 189, data transmission circuit 190 transmits a key status "1" bit and a hold status "0" bit over bus 114 to data receiver 310 for registration in line control register 330. When memory control circuit 340 compares the contents of register 330 with the contents of line memory register 345, it detects the change in status of key K6 and inserts a "1" in the proper position in the supervision bits in register 345 corresponding to the particular appearance of line L1 at set 101. Control circuit 340 also changes the ring bit to "0" in register 345.

At the same time, under control of memory control circuit 340 via path 349, terminal-line encoder 440 encodes the station set terminal number and the line terminal number from the information obtained from registers 461 and 463. The output of encoder 440 on path 442 thus contains identification of the two connection ends that enable switching network 200 to connect tip and ring leads T1 and R1 of station set 101 to line L1 for receiving the incoming call.

The updated contents of line memory register 345, including ring bit "0," hold bit "0" and a "1" supervision bit for the appearance of line L1 at station set 101, are written back into memory 357 by memory control circuit 340. The scan cycle continues under the control of system controller 320. The next time the appearance of line L1 at station set 101 is scanned and the corresponding line control word is read from memory 357 into register 345, the "0" ring bit thereof is extended over path 341 to generator 350. A zero ring signal is consequently transmitted over ring bus 113 and through inverter 250 to reset ring flip-flop 2RG, de-energizing ringer 120 to terminate ringing at station set 101. Line condition function generator 350 is also responsive to the "1" supervision bit along with the "0" ring and hold bits to alter the lamp signal transmitted over bus 112, changing the visual signal provided by lamp LP6 to indicate that the line associated with key K6 is in use.

If any other extension of line L1, such as key KK1 at set 102, goes off-hook to answer the call, it is handled in the same manner as station set 101 above during the scan of the station set at which the line appears. Of course, the ring bit in the pertinent line control word for line L1 in memory 357 will be set to "0" when the first station answers the incoming call, and ringing will be terminated and visual signaling changed at each station set having the line appearing thereat.

Assume now that both station set 101 and station set 102 are off-hook and that the two sets are bridged on line L1, that is, they key K6 at set 101 is depressed and that key KK1 at set 102 is depressed. Assume further that station set 101 decides to switch to another line appearance, such as the line associated with key K1. Key K1 is depressed, effecting the release of key K6 via the usual mechanical interlocking apparatus. On the next scan of key K6 at station set 101, therefore, the key status bit returned to common control for key K6 will change to a "0" since the release of key K6 disables gate 166. Memory control circuit 340 detects the change in status of this line appearance and sets the corresponding supervision bit in line memory register 345 to "0" before writing the line control word back into memory 357. Note that the line control word is written back into memory 357 because station set 102 is still using line L1 and a corresponding status "1" bit therefore appears in the line control word.

Responsive to this change in status of key K1 at station set 101, memory control circuit 340, via a disconnect signal over path 349, directs terminal-line encoder 440 to encode the terminal numbers for the station set and line from registers 461 and 463. The set and line terminal numbers and the disconnect signal are extended by encoder 440 over path 442 to switching network 200, which is responsive thereto to cause the connection between line L1 and the tip and ring conductors T1 and R1 to be broken.

Subsequently, during a scan of key K1 at station set 101 a status "1" bit therefor is returned to common control, the operation of key K1 enabling gate 161 to extend the key signal on lead 141 over lead 169 to data transmission circuit 190. Memory control circuit 340 detects the change in status of the key K1 line appearance from idle to active and sets the corresponding supervision bit in the line memory register to "1" before writing the line control word for this line into memory 357. From this point the situation is treated as an originating call from station set 101 on the line corresponding to key K1, which is described in detail below.

The call to station set 102 over line L1 is still in progress. Assume that station set 102 now wishes to place the call over line L1 on HOLD while using another of the lines appearing at set 102, such as the line associated with key KK30. Depressing nonlocking hold key HKK at set 102 enables each of gates KH1 through KH30. Since key KK1 is depressed a signal is extended by gate KH1 to the set terminal of hold flop-flop 5H1, setting hold flip-flop 5H1 to enable hold gate H1. During the next scan of the line appearance at key KK1, the key signal on control lead C1 is extended through enabled hold gate H1 and OR gate 510, through gate 505 (enabled by the off-hook condition of set 102), over lead 589 to data transmission circuit 590. Data transmission circuit 590 is responsive thereto to return a hold status "1" bit to line control register 330 along with the key status "1" bit. Memory control circuit 340 detects the change in status of the hold bit and sets the hold bit in line memory register 345 to "1" before writing the contents of register 345 back into memory 357.

At the same time memory control circuit 340 directs hold bridge translator 420, via path 422, to register the identity of an idle hold bridge in hold register 430. Under the control of circuit 340, a hold signal over path 349 directs terminal-line encoder 440 to encode the terminal number of the hold bridge registered in register 430 and the terminal number of line L1 from register 463. The two terminal numbers are extended over path 442 to switching network 200 which establishes the desired holding bridge connection to line L1 in the usual manner.

Release of hold key HKK releases key KK1 via the conventional mechanical interlocking apparatus. Thus, during the next scan of the line L1 line appearance at station set 102, hold flip-flop 5H1 is reset and the key status bit returned for key KK1 to register 330 changes from "1" to "0." Detection of this change in key status for key KK1 by memory control circuit 340 effects the disconnect of line L1 from the tip and ring conductors T2 and R2 of set 102 in the manner described above and effects the updating of the pertinent supervision bit in the line control word. Disconnect, it will be recalled, is effected in response to a disconnect signal from circuit 340 over path 349 to terminal-line encoder 440, encoder 440 extending the disconnect signal over path 442 to switching network 200 along with the terminal number of line L1 and the terminal number of station set 102.

In the event that more than one line appearance of line L1 is active when hold key HKK is depressed, as detected by the presence of more than one supervision "1" bit in the line control word in register 345, the hold bit in the line control word is not set to "1." In this event only the appropriate supervision bit for key KK1 is set to "0." This eliminates unnecessary hold bridge connections.

When station set 102 subsequently removes line L1 from HOLD by depressing key KK1 again, the key status bit returned to line control register 330 during the next scan of key KK1 will be a "1." The hold status bit returned will be a "0" since hold flip-flop 5H1 is reset and hold gate H1 is disabled. Upon detection of a "0" hold bit and "1" key bit in line control register 330, memory control circuit 340 changes the corresponding supervision bit of the line control word in register 345 to "1" and writes the line control word back into memory 356. The "1" hold bit in the line control word is not changed at this time. Control circuit 340 also sends a connect signal over path 349 to encoder 440. Encoder 440 directs the proper station and line terminal numbers over path 442 to switching network 200 for reestablishing the connection between station set 102 and line L1.

On the next scan of this line appearance of line L1, the returned status bits from station set 102 are a "1" key bit and a "0" hold bit. The corresponding bits in the line control word in register 345 are a "1" supervision bit and a "1" hold bit. At this point then memory control circuit 340 changes the hold bit in register 345 to "0" and directs a disconnect signal over path 422 to hold bridge translator 420 and over path 349 to terminal-line encoder 440. The identity of the hold bridge connected to line L1 is registered in hold register 430 and extended over path 432 to terminal-line encoder 440. Encoder 440 directs the hold bridge terminal number and the terminal number for line L1 to switching network 200 for disconnection of the hold bridge from line L1.

When the call on line L1 is terminated subsequently by station set 102 going on-hook or releasing key KK1, the succeeding scan of key KK1 yields a key status "0" bit and a hold status "0" bit to line control register 330. Control circuit 340 updates the corresponding supervision bit in the line control word in register 345 and sends a disconnect signal to terminal-line encoder 440 to effect disconnect of station set 102 from line L1 in a manner described above. Assuming that all of the supervision bits in the line control word in register 345 are now "0," indicating no active stations on line L1, no control word is written into memory 357 for line L1. Control returns to system controller 320 and the cycle continues.

Consider now a call origination, such as station set 101 going off-hook with key K1 depressed. For the purposes of description, let key K1 correspond to the appearance at set 101 of line L3 (not shown). When key K1 is scanned a key status "1" bit and a hold status "0" bit are returned to line control register 330. Assuming that the search of memory 357 by control circuit 340 yielded no line control word therein for line L3, that is, that line L3 was not being used previous to the present scan, no line control word will appear in register 345. Control circuit 340 detects the key status "1" bit in line control register 330, places a "1" in the corresponding supervision bit position in line memory register 345, and writes the line number and supervision bit into memory 357 as a line control word for line L3.

At the same time, memory control circuit 340 sends a connect signal over path 349 to encoder 440, directing encoder 440 to encoder and extend the terminal number for station set 101 and the terminal number for line L3 over path 442 to switching network 200. The terminal number for set 102 appears in register 461 and the line number for line L3 appears in register 463, it will be recalled, when the line appearance word for the appearance of line L3 at set 101 is read out of memory 455. Switching network 200 effects the proper connection between tip and ring conductors T1 and R1 and line L3, and the cycle proceeds from this point under control of system controller 320 in the same manner as described above for an incoming call.

It is to be understood that the above-described arrangements are but illustrative of the application of the principles of the present invention. Numerous other arrangements may be employed by those skilled in the art without departing from the spirit and scope of the invention.

What is claimed is:

1. A key telephone system comprising, switching means, a plurality of telephone lines connected to said switching means, a plurality of telephone stations each having a plurality of keys in which said keys are representative of individual ones of said lines, means including a data memory for periodically scanning said keys in sequence, means including a temporary memory operative during said scanning for providing control signals to said stations and for receiving and storing status signals from said stations, and means including said switching means responsive to said status signals for selectively interconnecting individual ones of said stations to individual ones of said lines.

2. A key telephone system in accordance with claim 1 wherein said data memory is a read-only memory having stored therein a unique code word associated with each appearance of one of said lines at one of said stations.

3. A key telephone system in accordance with claim 2 wherein said temporary memory is a content-addressed memory having stored therein the status of each active one of said lines.

4. A key telephone system in accordance with claim 3 further comprising means resopnsive to an incoming call on one of said lines for providing control signals to said means including said temporary memory.

5. A key telephone system in accordance with claim 1 wherein each of said stations includes signaling means associated with said keys and logic means responsive during scanning to selected ones of said control signals for operating said signaling means and for generating said status signals.

6. A key telephone system comprising a switching network having a plurality of input and output paths, a plurality of telephone lines connected to said input paths, a plurality of telephone stations each having a plurality of keys in which said keys are representative of individual ones of said lines, a voice communication channel individually connecting each of said stations to a respective one of said output paths, means for periodically generating and transmitting to all of said stations a sequence of code words each corresponding to one of said keys and to the identity of the line represented by said one key, logic means in each of said stations responsive to certain ones of said code words for generating signals indicative of operated ones of said keys, means responsive to said signals to selectively interconnect individual ones of said input paths to individual ones of said output paths, storage means for storing the line identity corresponding to said code words along with said signals, and means responsive to a generated code word for a line identity corresponding to a particular line identity stored in said storage means for modifying a portion of said code word for transmission thereof to said stations.

7. A key telephone system in accordance with claim 6 wherein said last-mentioned means is responsive to said correspondence for modifying a portion of said code word in accordance with the signals stored along with said particular line identity in said storage means.

8. A key telephone system in accordance with claim 6 wherein said generating and transmitting means comprises a memory having a unique information word stored therein associated with each of said keys, each said information word identifying the associated key and the individual one of said lines represented by said associated key, means for sequentially reading out said information words and for transmitting the key identifying portions of said information words as said code words to said stations.

9. A key telephone system in accordance with claim 8 wherein said storage means comprises content-addresed storage means, and means responsive to the line identifying portions of said information words read from said memory for addressing said content-addressed storage means to read out said signals stored therein.

10. A key telephone system in accordance with claim 9 further comprising means responsive to a call received on one of said telephone lines for storing the identity of said one line in said content-addressed storage means.

11. A key telephone system in accordance with claim 10 wherein said modifying means comprises means resonsive to said signals read out of said content-addressed storage means for modifying said code words to include manifestations of said signals for transmisison to said stations.

No references cited.

KATHLEEN H. CLAFFY, Primary Examiner

T. J. D'AMICO, Assistant Examiner